June 19, 1956
A. SZENT-GYORGYI ET AL
2,751,326
ASSAY METHOD FOR DIGITALIS PREPARATION
AND OTHER CARDIOTONIC SUBSTANCES
Filed Jan. 24, 1952
2 Sheets-Sheet 2
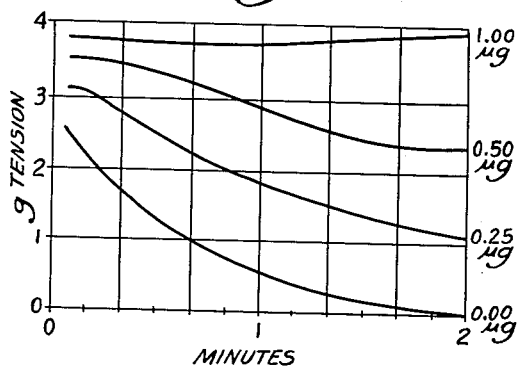
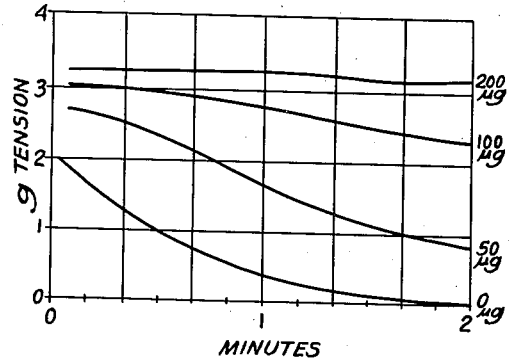
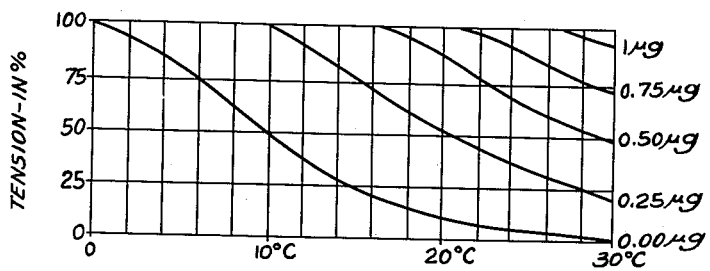
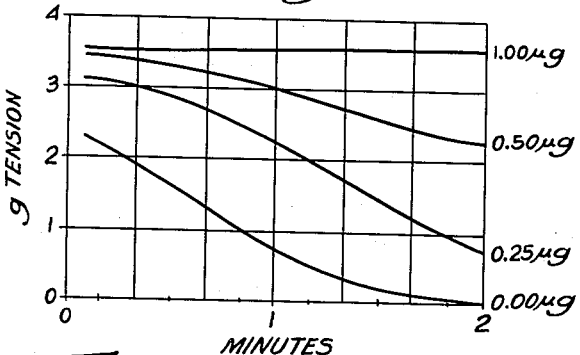
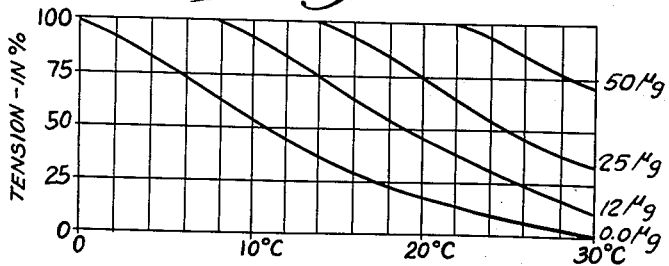
INVENTORS:
Albert Szent-Gyorgyi
and Stephen Hajdu,
BY Carl C. Batz
ATTORNEY.

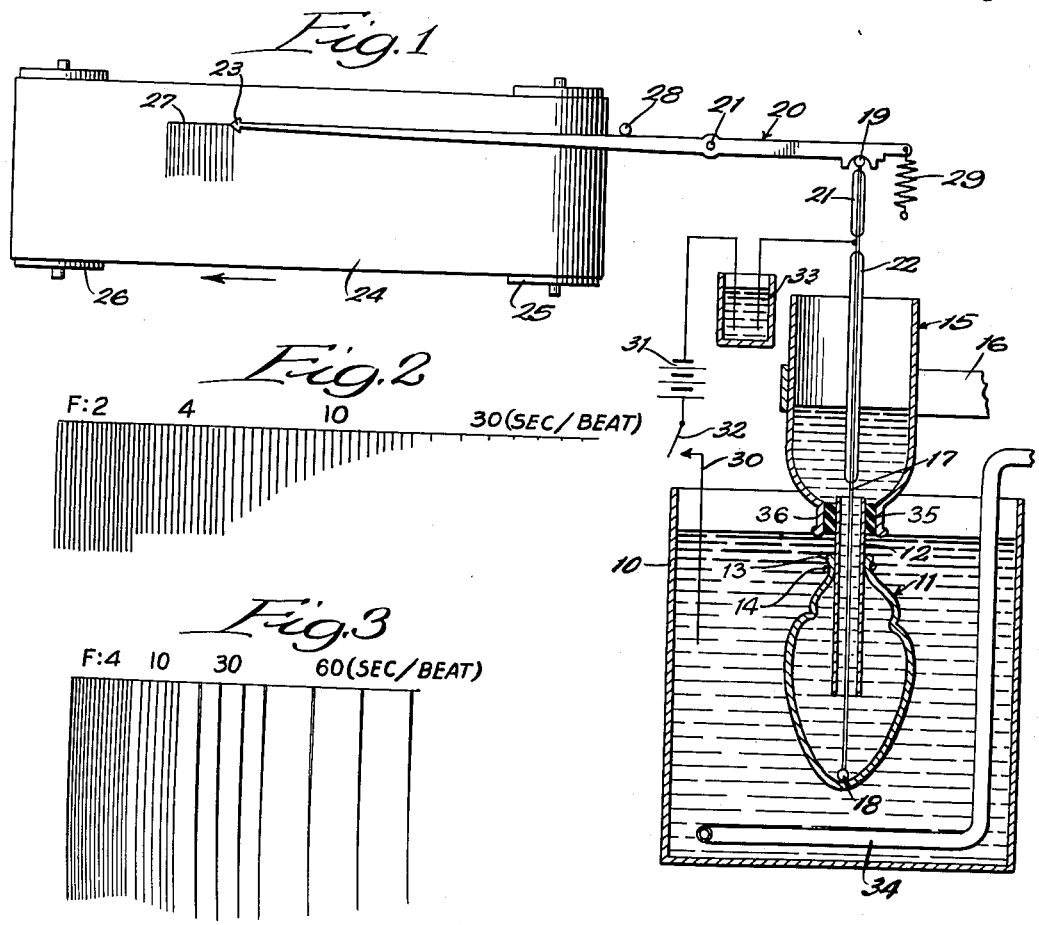

United States Patent Office 2,751,326
Patented June 19, 1956

2,751,326
ASSAY METHOD FOR DIGITALIS PREPARATION AND OTHER CARDIOTONIC SUBSTANCES

Albert Szent-Gyorgyi and Stephen Hajdu, Woods Hole, Mass., assignors to Armour and Company, Chicago, Ill., a corporation of Illinois Application January 24, 1952, Serial No. 268,108

19 Claims. (Cl. 167—84.5)

Our invention relates to an assay method for digitalis preparations and other substances and to an apparatus for carrying out the method. More particularly our invention relates to a method of determining the relative potency of digitalis and the active principals isolated from it such as digitoxin, etc. Our invention also has utility in determining the relative potency of other substances having similar chemical structure and physiological activity to that of digitalis.

Digitalis is a medicinal preparation made from the leaves of *Digitalis purpurea* and has properties making it useful therapeutically as a cardiac stimulant. Many different active principals have been isolated from it, most of which are glucosides. The digitalin is generally used to refer to a mixture of glucosides extracted from the digitalis leaves, including digitoxin, digitalin, and digitalein. It is an amorphous yellow powder soluble in water and alcohol. Digitoxin is generally assumed to be the chief active principal of digitalis and digitalin. For purposes of simplicity in description in the following specification and claims, the term "digitalis preparations" will be used to refer to all physiologically active substances obtained from digitalis leaves, unless a specific glucoside such as digitoxin is designated.

In the medicinal use of digitalis preparations, it is necessary to standardize the preparations prior to administration so that their physiological effect can be accurately predicted. Heretofore, the method used has been to find the concentration of the preparation to be standardized which induces systolic stoppage of the severed heart of an animal, and comparing this with the amount of a standard preparation required to produce a similar effect on a different heart. One serious defect of this method is that the systolic contracture of the heart is irreversible, and once induced by the preparation renders the heart unfit for further use. This makes it impossible to compare an unknown digitalis preparation with a standard preparation on the same heart. Thus, the investigator is compelled to work statistically, which entails the waste of time and material, and leads to a less accurate determination of the relative potency of the unknown preparation with that of the standard due to the variation in the different hearts employed in the tests.

It is also our belief that the systolic stoppage method of standardizing digitalis preparations is inadequate because the activity measured by this method does not correspond to the desired therapeutic action of the preparations. In other words, our investigations have led us to believe that the systolic standstill is due to an unwanted toxic effect, which is not necessarily directly correlated with the factors producing the favorable therapeutic action.

Therefore it is an object of our invention to provide a method for standardizing digitalis preparations which substantially overcomes the above described difficulties and inadequacies. More specifically, it is an object of our invention to provide a method of determining the relative potency of a digitalis preparation in which the same heart can be employed, and more generally in which one heart can be used for a relatively large number of standardization tests. Also, it is an object of our invention to provide a method for standardizing digitalis preparations in which the standard of comparison corresponds to the desired therapeutic action of the drug, as distinguished from its unwanted toxic effects. It is a still further object of our invention to provide an apparatus for carrying out our new method by means of which the systolic tension of a severed heart can be accurately measured. Further objects and advantages of our invention will appear as the specification proceeds.

Our invention is illustrated in the accompanying drawing, in which—

Figure 1 is a somewhat schematic side elevational view of an apparatus by means of which our standardization method can be carried out; Fig. 2, an indicator diagram formed by the apparatus of Fig. 1 showing the normal Staircase effect obtained by varying the frequency of beat of the frog's heart; Fig. 3, another indicator diagram produced by the apparatus of Fig. 1 showing the abolition of the Staircase over a wide frequency range due to the stimulation of the frog's heart with a digitalis preparation; Fig. 4, a graph showing the relative amounts of tension developed by a frog's heart at various frequencies and temperatures, and Figs. 5 to 9, experimentally determined graphs which can be used in standardizing specific substances.

It has been known for a long period of time that a perfused frog heart exhibits a stronger beat at a higher than at a lower frequency. The discovery of this phenomenon has been attributed to Bowdich, and has been termed the "Staircase," because the strength of the beat decreases as the frequency of beat decreases in stairstep fashion. Heretofore, however, this phenomenon has merely been a scientific curiosity, and has not to our knowledge been used in any practical application.

We have now discovered that the Staircase can be diminished or entirely abolished by introducing digitalis preparations into the perfusion solution. In other words, if such preparations are added in sufficient concentration to the perfusion fluid the Staircase disappears and maximal systolic tension is developed at all frequencies.

Based on the above discovery, we have developed quantitative tests by means of which the relative potency of digitalis preparations can be determined, and have also developed an apparatus for carrying out these tests.

In general, our method for determining the relative potency of digitalis preparations, so that the preparations can be standardized, involves the steps of forming a solution of predetermined volume from a measured quantity of the digitalis preparation, suspending a severed animal heart capable of exhibiting the Staircase effect such as a frog heart with at least a portion thereof immersed in the solution, electrically exciting the heart at uniform intervals to cause it to beat at a definite frequency, measuring the strength of the beat at the established frequency, varying the length of the uniform intervals between electrical excitation to cause the heart to beat at a different frequency, and again measuring the strength of the beat to determine whether it has substantially changed. By this series of steps, it is possible to compare the potency of an unknown digitalis preparation with that of a standard preparation by repeating the steps for both preparations with the same heart. For example, if the strength of beat begins to diminish, or in other words the Staircase first appears, at about the same frequency for the same concentration of both the standard and the unknown preparation, it can be assumed that the unknown preparation is of substantially the same potency as the standard.

As can be seen from the above general description, in order to carry out our method it is necessary to employ an apparatus adapted to accurately measure the strength of beat of an animal heart. It has been found that the best method of measuring the strength of contraction of muscles is to oppose the contraction of the muscle with a force of sufficient magnitude to develop measurable tension therein. The ordinary method of doing this involves the attachment of a registration lever to the tendon of the muscle and spring biasing this lever against the contraction of the muscle. However, this means cannot be employed for measuring the strength of contraction of a heart, since the heart muscles have no tendon to which the registration lever can be attached. If the lever is attached to the heart muscles themselves, these tissues will be torn by the force of the beat.

In Figure 1 there is illustrated an apparatus of our invention for measuring the systolic tension developed by a frog's heart when its contraction is opposed so that the heart muscles are prevented from fully shortening. It will be understood that for purposes of simplicity of illustration that this apparatus is shown somewhat schematically. In the illustration given, 10 designates a vessel adapted to hold a solution of the preparation being tested. A severed frog's heart 11 is suspended within vessel 10 so that it can be at least partially immersed in the solution therein. Preferably, the heart is completely immersed in the solution, and the interior chambers of the heart are also completely filled with the solution.

Any suitable method can be used for supporting the frog's heart 11. Preferably, however, a tube or cannula 12 is inserted through the aorta, so as to extend downwardly to a spaced distance above the bottom of the heart, and upwardly above the solution level within vessel 10. It will be understood that heart 11 is secured to tube 12 by means such as thread 14, which as in the illustration given is tied about the aorta 13.

Various means can be provided for supporting tube 12. In the illustration given, the top of tube 12 is inserted through an apertured plug 35 seated within the restricted neck portion 36 of an enlarged tube 15. A support bracket or clamp 16 is secured about tube 15.

Within tubes 12 and 15 there is slidably mounted a rod 17, which is preferably a wire of small diameter. Rod 17 is extended below the lower end of tube 12 to a point adjacent the lower wall of heart 11, and the end thereof is adapted to be engaged by the heart wall without tearing the wall so that the rod can be moved upwardly in response to the contraction of the heart. This can be conveniently accomplished by providing an enlarged contact button 18 on the bottom end of rod 17. Button 18 can be integrally formed or a member such as a glass bead can be attached thereto.

In the illustration given, wire 17 extends upwardly above the top of tube 15 and is provided at its upper end with a rounded actuating button 19 for engaging registration lever 20. If desired, the upper portions of wire 19 can be reinforced by drawing capillary tubes 21 and 22 thereover. Registration lever 20 is pivotally mounted at 21, and is equipped at its outer registration end with a marked member 23 adapted to oscillate over a moving strip of paper 24. In the illustration given, strip 24 is transferred from roll 25 to roll 26 so as to move at a uniform speed past marker 23. It will be understood that any suitable mechanical means (not shown) can be provided for actuating rolls 25 and 26.

In order to have registration lever 20 trace out diagrams having a base line 27, a stop member 28 is provided to limit the upward swing of the lever. Registration lever 21 is spring biased against stop 28 by tension spring 29, which in the illustration given, is secured to lever 20 on the opposite side of pivot 21 from that of marker 23. Spring 29 also serves to bias rod 17 downwardly and thereby oppose the contraction of the heart with a force of sufficient magnitude to develop measurable tension therein.

In order that the frequency of beat of the heart can be varied, it is desired to provide means for electrically exciting the heart at uniform intervals. Preferably, when this method is used one electrode is positioned within heart 11 and the other electrode is positioned exterior thereto. In the illustration given, rod 17 is used as the interior electrode, while the exterior electrode is indicated at 30. A battery 31 is provided having one terminal connected to rod 17 and the other terminal connected to electrode 30 through key switch 32. If desired, the friction due to the electrical connection to rod 17 can be diminished by passing the current through an electrolyte bath 33 in which the free end of the wire connected to rod 17 is allowed to dangle.

It is also desired to provide means for controlling the temperature of the solution within vessel 10. Since it is mainly desired to control this temperature within the range from about 0° C. to 25° C., this can conveniently be done by means of a temperature regulating coil 34 through which fluid can be passed to either heat or cool the solution as desired.

In preparing the frog's heart for use in the apparatus of Fig. 1, it is necessary to stop the heart's own beat so that the frequency of its beat can be varied as desired. This can conveniently be done by destroying the sinus node. The heart can then be excited electrically by manually closing switch 32 for an instant to cause an electric current to pass between the external electrode 30 and the internal electrode 17. This stimulation causes the heart to contract, pushing rod 17 upwardly against one end of registration lever 21. Rod 17 continues to move upwardly until the systolic tension developed by the heart is balanced by the force of spring 29. At a given frequency, the heart after a few beats will develop a constant tension. Thus, when switch 32 is closed at uniform intervals, marker 23 will trace out a pattern of lines on recorder tape 24 similar to the pattern indicated in Fig. 1. In the absence of a digitalis preparation in the perfusion solution, when the frequency of beat of a heart is varied, as by increasing the time interval between the closing of switch 32 to provide the electrical stimulation, the strength of beat will substantially change. For example, when the heart is first caused to beat at the rate of one beat every two seconds, and then the interval between beats is progressively increased, a pattern is traced out by the oscillatioins of the registration lever (as shown in Fig. 2) which exhibits the Staircase effect discussed above.

One method of using the apparatus shown in Fig. 1 to standardize an unknown digitalis preparation is to prepare a calibration solution from an aqueous perfusion solution and a measured quantity of a digitalis preparation of known potency. The perfusion solution will contain electrolyte substances, as will subsequently be described in detail. The calibration solution is poured into vessel 10 so as to completely cover the heart 11 and also into tube 15 so as to fill the interior of the heart. With the temperature of the solution held at a constant value, say 25° C., the heart is caused to beat first at a fast frequency and then at successively slower frequencies until the fastest frequency is determined at which the systolic tension of the heart begins to substantially decrease from that measured at the faster frequencies. In other words, the frequency range is determined within which the staircase just begins to appear. The calibration solution is then removed from vessel 10 and from within the heart, and the heart is thoroughly washed to remove any residual digitalis absorbed therein. Another aqueous solution is then prepared from the same perfusion solution and a measured quantity of an unknown digitalis preparation. This test solution is introduced into vessel 10 and within heart 11 in the same way as the calibration solution. The heart is again caused to beat at varying frequencies to determine the approximate frequency range within which the staircase just begins to appear. If the highest frequency at which the staircase manifests itself is approximately the same for the unknown preparation as for the standard, and they were both present in the solutions in the same concentration, it can be assumed that the unknown material is of the same potency as the known material. Further, it will be apparent that if there is a variance in the measured frequencies at which the Staircase just begins to appear that it will be indicated whether the unknown preparation is more or less potent than the standard. Thus, the concentration of the unknown material can be varied by repeating the test procedure until the exact equivalent weight or concentration of the unknown preparation to that of the standard preparation is determined.

A modification of the foregoing procedure is made possible by the discovery that the Staircase disappears at low temperatures. Fig. 4 shows a typical graph of the tension developed by a perfused frog heart at varying frequencies and temperatures. The abscissa is scaled in degrees centigrade, and the ordinate has an arbitrary scale corresponding to the tension developed by the heart as indicated by the length of the lines traced out by the concentration lever. Each curve reports a different frequency of beat. These are as follows: $a$, one beat every half second; $b$, one beat per second; $c$, one beat per two seconds; $d$, one beat per four seconds; $e$, one beat per ten seconds; $f$, one beat per thirty seconds; and $g$, one beat per minute. The significant point about these curves is that they all approach a common point as the temperature decreases. It has been found that generally all of the curves merge into a single curve at about 0° C., when the perfusion solution does not contain digitalis or other stimulating substances. However, when a digitalis preparation is introduced into the perfusion solution, the curves will merge into one curve at a higher temperature. Thus, it is possible to compare the potency of an unknown digitalis preparation with that of the standard by determining the temperature at which the Staircase does not appear at any frequency first for the standard preparation and then for the unknown preparation. If these temperatures are the same, it can then be assumed that the potency of the unknown material is the same as that of the standard, or if they vary it will be indicated whether the unknown material is of stronger or lesser potency than the standard. For example, if the digitalis preparation at a given concentration weakly suppresses the Staircase, this weak action will declare itself in eliminating the Staircase at 5° C., but not at 10° C. A stronger action may suppress the Staircase at 10° C., but no more at 20° C. Therefore, it can be seen that the activity can be characterized by stating the temperature at which the Staircase just appears or just does not appear.

Fig. 3 indicates the type of pattern that is traced out by the registration lever when the heart is developing maximum tension at all frequencies. It will be understood from the above discussion that the pattern will be obtained when the temperature of the perfusion solution is sufficiently lowered, or when the concentration of the digitalis preparation is sufficiently increased so as to eliminate the Staircase at a particular temperature.

In the actual carrying out of our method by means of an apparatus similar to that shown in Fig. 1, it has been determined that a single frog's heart can be used repeatedly, so that a large number of unknown preparations can be compared with a standard preparation on the same heart while only having to run one test of the standard preparation. Furthermore, we have found that the potency determined by our method does not necessarily correspond to the potency determined by the generally employed method of producing systolic stoppage. It is our opinion that our method provides a more accurate measure of the favorable therapeutic action of digitalis preparations than the former method.

We prefer to employ perfusion solutions providing an ionic atmosphere adapted to maximize the Staircase effect so that the potency of the material being tested can be more accurately determined. For proper functioning of the heart, the ionic atmosphere should include at least sodium, potassium, and calcium ions. Other ions can also be present if desired. In actual practice, we have found that a standard Ringer solution can be advantageously employed, being an aqueous isotonic solution containing 0.65% sodium chloride, 0.03% potassium chloride and 0.025% calcium chloride. Modifications of the standard Ringer solution can also be employed such as a Ringer-Conway solution, being an aqueous solution of the following composition in millimoles per liter (mM./l.): 103.8 sodium ions, 2.5 potassium ions, 0.9 calcium ions, 1.2 magnesium ions, 74.5 chloride ions, 25.0 bicarbonate ions, 3.0 phosphate ions, 1.8 sulfate ions, 1.9 gluconate ions, and 26.0 glucose.

Also, if desired the perfusion solution can be shaken up with carbon dioxide before use in order to prevent the precipitation of calcium when calcium ions are present therein. Preferably, the perfusion solution should contain at least a 0.6 milli-molar concentration of calcium ions.

More generally, we prefer to employ a perfusion solution having a molar concentration of sodium to potassium ions of at least 40 to 1. For example, good results are obtained when the concentration of sodium and potassium ions is as low as 100 mM./l. to 2.5 mM./l., and as high as 200 mM./l. to 5 mM./l. It has been found that the ratio of sodium and potassium ions in the perfusion solution is important in maximizing the Staircase effect. If the molar ratio of sodium to potassium ions is decreased from 40 to 1 to say 30 to 1 the Staircase effect begins to be diminished. Further, it is generally desirable to keep the concentration of inorganic salts in the perfusion solution at a low value since high concentrations do not favor the muscular activity of the heart. However, an increase in the total salt concentration in the perfusion solution does not appear to have any appreciable effect on the Staircase. For example, when the salt concentration is increased three-fold over that of a standard Ringer solution, the Staircase effect is still clearly observable over a wide range of frequencies. In actual practice, it is desirable to keep the total concentration of salts below 0.12 molar concentration.

While in the foregoing we have described our method in connection with the standardization of digitalis preparations we wish it understood that it is also applicable to other preparations which are capable of stimulating a frog's heart so as to suppress the Staircase. In general, our method has utility in connection with the standardizing of preparations which contain substances closely chemically related to digitalis such as strophanthus preparations and desoxycorticosterone preparations (DOC). Strophanthin is a mixture of glucosides obtained from the seeds of strophanthus and is used medically as a heart tonic. The strophanthin glucosides are closely chemically related to the digitalis glucosides. Desoxycorticosterone is one of the active cortical steroids found in adrenal extract, and is also closely chemically related to the digitalis glucosides. The standardization of these various preparations is illustrated in the following examples:

EXAMPLE I

*Standardization of digitalis preparations by constant temperature method*

Two different commercial types of digitalis were compared at room temperature (21° C.): digitoxin (Fig. 5), and digitan (Fig. 6). In each graph the ordinate represents the tension of first contraction of heart in Staircase phenomenon given in grams, while the abscissa represents the duration of heart standstill given in minutes.

In Fig. 5 the maximum tension of a normal heart (0.00 µg. per cc.) is shown at 2 sec. As the period of standstill is lengthened the tension falls rapidly and if the heart is at a standstill for 2 minutes, the tension of the first contraction is 0.

If 0.25 μg. per cc. digitoxin is administered, the corresponding tension values will be higher. If 0.50 μg. per cc. is administered, tension values will be higher still and if 1.00 μg. per cc. is administered, tension values will be maximal even after 2 minutes' standstill.

In Fig. 6 the same tensions were obtained with digitan (a somewhat crude digitalis preparation) with the administration of 50, 100 and 200 μg. per cc.

EXAMPLE II

*Standardization of digitalis preparation by variable temperature method*

As previously discussed, the normal heart washed in Ringer solution does not reveal the Staircase phenomenon at 0° C. This means that the tension is the same at high and low frequencies, down to a frequency of 1 min. If the temperature is raised, the higher frequencies (2–5 sec.) give maximal tension (100%), while at lower frequencies (1 min.) tension falls rapidly, revealing the Staircase phenomenon. If a digitalis preparation (Fig. 7, digitoxin) is administered, the Staircase will appear at increasingly high temperatures according to the dosage. With 0.25 μg. per cc. of digitoxin at 10° C., with 0.50 μg. per cc. at 16.5° C., with 0.75 μg. per cc. at 21° C., with 1.00 μg. per cc. at 27° C.

EXAMPLE III

*Standardization of strophanthus preparation*

Following the procedure of Example I, strophantin was administered in three increasing doses (0.25, 0.50, and 1.00 μg. per cc.), and the graph illustrated in Fig. 8 was obtained.

EXAMPLE IV

*Standardization of desoxycorticosteron preparation*

The procedure of Example II was followed, but instead of digitoxin desoxycorticosteron was administered. The order of the appearance of the Staircase phenomenon is as follows: Normal at 0° C., with 12.5 μg. per cc. DOC at 8° C. with 25 μg. per cc. at 14° C., with 50 μg. per cc. at 22° C. These results are illustrated in the graph of Fig. 9.

While in the foregoing specification we have set forth specific details of our apparatus and method for standardizing digitalis preparations and the like, it will be readily apparent to those skilled in the art that many of these details can be varied widely without departing from the spirit of our invention.

We claim:

1. In a method of characterizing the potency of a heart stimulant preparation containing glucosides, the steps of forming a test solution from a sample of said preparation of unknown potency, suspending the severed heart of a frog or the like with at least a portion thereof immersed in said solution, electrically exciting said heart at uniform intervals to cause said heart to beat at a definite frequency, measuring the strength of the beat of said heart at said frequency, varying the length of said uniform intervals between the electrical excitation to cause said heart to beat at a different frequency, again measuring the strength of beat of said heart at the new frequency to determine whether the strength of beat has substantially changed and then comparing the measurements thus obtained with measurements obtained by the same procedure for a standard sample of the preparation having a known potency.

2. The method of claim 1 in which said heart stimulant preparation is a digitalis preparation.

3. In a method of determining the potency of a heart stimulant preparation containing glucosides, the steps of forming a test solution from a sample of said preparation of unknown potency, suspending the severed heart of a frog within said solution, opposing the contraction of said heart by exerting a force of sufficient magnitude against the inside of the walls of said heart to develop substantial tension in said heart walls, electrically exciting said heart at uniform intervals to cause said heart to beat at a definite frequency, measuring the systolic tension developed by said heart at said frequency, varying the length of said uniform intervals between electrical excitation to cause said heart to beat at a different frequency, again measuring the systolic tension developed by said heart to determine whether the tension has substantially changed and then comparing the measurements thus obtained with measurements obtained by the same procedure for a standard sample of the preparation having a known potency.

4. The method of claim 3 in which said heart stimulant preparation is a digitalis preparation.

5. In a method of determining the potency of a heart stimulant preparation containing glucosides, the steps of forming an aqueous electrically conductive test solution from a sample of said preparation of unknown potency, suspending the severed heart of a frog so that it is submerged within said solution and filling said heart interiorly with said solution, opposing the contraction of said heart by exerting a force of sufficient magnitude against the inside of the walls of said heart to develop measurable tension in said heart walls, passing an electric current between a point outside of said heart and a point within said heart at uniform intervals to cause said heart to beat at a definite frequency, measuring the systolic tension developed by said heart, varying the length of said uniform intervals between the passing of said current through said solution to cause said heart to beat at a different frequency, again measuring the systolic tension developed by said heart to determine whether the tension has substantially changed and then comparing the measurements thus obtained with measurements obtained by the same procedure for a standard sample of the preparation having a known potency.

6. The method of claim 5 in which said heart stimulant preparation is a digitalis preparation.

7. In a method of determining the potency of a heart stimulant preparation containing glucosides, the steps of forming an aqueous test solution from a sample of said preparation of unknown potency, suspending the severed heart of a frog with at least a portion thereof immersed in said solution, opposing the contraction of said heart by exerting a force of sufficient magnitude against the inside of the walls of said heart to develop measurable tension in said heart walls, electrically exciting said heart at uniform intervals while maintaining a constant temperature in said solution to cause said heart to beat at a definite frequency, measuring the systolic tension developed by said heart at said frequency, systematically varying the length of said uniform intervals while maintaining said solution at the same temperature, continuing to measure the systolic tension developed by said heart until the frequency is determined at which said tension decreases from that measured at higher frequencies than said frequency and then comparing the measurements thus obtained with measurements obtained by the same procedure for a standard sample of the preparation having a known potency.

8. The method of claim 7 in which said heart stimulant preparation is a digitalis preparation.

9. In a method of determining the potency of a heart stimulant preparation containing glucosides, the steps of forming an aqueous electrically conductive test solution from a sample of said preparation of unknown potency, suspending the severed heart of a frog so that it is submerged within said solution and filling said heart interiorly with said solution, opposing the contraction of said heart by exerting a force of sufficient magnitude against the inside of the walls of said heart to develop measurable tension in said heart walls, passing an electric current between a point outside of said heart and a point within said heart at uniform intervals while maintaining a constant temperature in said solution to cause said heart to beat at a definite frequency, measuring the systolic tension developed by said heart at said frequency, systematically varying the length of said uniform intervals between the passing of said current through said solution while maintaining said solution at the same temperature, continuing to measure the systolic tension developed by said heart until the frequency is determined at which said tension decreases from that measured at higher frequencies than said frequency and then comparing the measurements thus obtained with measurements obtained by the same procedure for a standard sample of the preparation having a known potency.

10. The method of claim 9 in which said heart stimulant is a digitalis preparation.

11. In a method of determining the potency of a heart stimulant preparation containing glucosides, the steps of forming a test solution from a sample of said preparation of unknown potency, suspending the severed heart of a frog within said solution, opposing the contraction of said heart by exerting a force of sufficient magnitude against the inside of the walls of said heart to develop substantial tension in said heart walls, systematically electrically exciting said heart at intervals of varying length to cause said heart to beat at varying frequencies, measuring the systolic tension developed at said various frequencies, while concurrently varying the temperature of said solution until the highest temperature is approximately determined at which said heart develops substantially the same systolic tension at all normal frequencies and then comparing the measurements thus obtained with measurements obtained by the same procedure for a standard sample of the preparation having a known potency.

12. The method of claim 11 in which said heart stimulant is a digitalis preparation.

13. A method of determining the potency of a heart stimulant preparation containing glucosides, the steps of forming an aqueous electrically conductive test solution from a sample of said preparation of unknown potency, suspending the severed heart of a frog so that it is submerged within said solution and filling said heart interiorly with said solution, opposing the contraction of said heart by exerting a force of sufficient magnitude against the inside of the walls of said heart to develop measurable tension in said heart walls, passing an electric current between a point outside of said heart and a point within said heart at varying intervals to cause said heart to beat at various different frequencies, measuring the systolic tension developed by said heart at said frequencies, while concurrently varying the temperature of said solution until the highest temperature is approximately determined at which said heart develops substantially the same systolic tension at all normal frequencies and then comparing the measurements thus obtained with measurements obtained by the same procedure for a standard sample of the preparation having a known potency.

14. The method of claim 13 in which said heart stimulant is a digitalis preparation.

15. In a method of determining the potency of a preparation selected from the group consisting of digitalis, strophanthus, and desoxycorticosteron preparations, the steps of forming an aqueous electrically conductive test solution from a sample of said preparation of unknown potency, said solution containing sodium and potassium ions in a ratio of at least 40 sodium ions to 1 potassium ion, suspending the severed heart of a frog so that it is submerged within said solution and filling said heart interiorly with said solution, opposing the contraction of said heart by exerting a force of sufficient magnitude against the inside of the walls of said heart to develop measurable tension in said heart walls, passing an electric current between a point outside of said heart and a point within said heart at uniform intervals to cause said heart to beat at a definite frequency, measuring the systolic tension developed by said heart, varying the length of said uniform intervals between the passing of said current through said solution to cause said heart to beat at a different frequency, again measuring the systolic tension developed by said heart to determine whether the tension has substantially changed and then comparing the measurements thus obtained with measurements obtained by the same procedure for a standard sample of the preparation having a known potency.

16. In a method of determining the potency of a preparation selected from the group consisting of digitalis, strophanthus, and desoxycorticosteron the steps of suspending the severed heart of a frog so that it is submerged within and filling said heart interiorly with a Ringer-type solution containing a sample of said preparation of unknown potency, opposing the contraction of said heart by exerting a force of sufficient magnitude against the inside of the walls of said heart to develop measurable tension in said heart walls, passing an electric current between a point outside of said heart and a point within said heart at uniform intervals to cause said heart to beat at a definite frequency, measuring the systolic tension developed by said heart, varying the length of said uniform intervals between the passing of said current through said solution to cause said heart to beat at a different frequency, again measuring the systolic tension developed by said heart to determine whether the tension has substantially changed and then comparing the measurements thus obtained with measurements obtained by the same procedure for a standard sample of the preparation having a known potency.

17. In a method of determining the potency of a preparation selected from the group consisting of digitalis, strophanthus, and desoxycorticosteron, the steps of forming an aqueous perfusion solution of predetermined volume containing a measured quantity of a sample of said preparation having an unknown potency and less than about 0.12 molar concentration of inorganic salts, said salts providing sodium potassium, and calcium ions, suspending the severed heart of a frog so that it is submerged within said solution and filling said heart interiorly with said solution, opposing the contraction of said heart by exerting a force of sufficient magnitude against the inside of the walls of said heart to develop measurable tension in said heart walls, passing an electric current between a point outside of said heart and a point within said heart at uniform intervals to cause said heart to beat at a definite frequency, measuring the systolic tension developed by said heart, varying the length of said uniform intervals between the passing of said current through said solution to cause said heart to beat at a different frequency, and again measuring the systolic tension developed by said heart to determine whether the tension has substantially changed and then comparing the measurements thus obtained with measurements obtained by the same procedure for a standard sample of the preparation having a known potency.

18. In a method of determining the potency of a preparation selected from the group consisting of digitalis, strophanthus, and desoxycorticosteron preparations, the steps of forming an aqueous electrically conductive solution of predetermined volume from a measured quantity of a sample of said preparation having an unknown potency, said solution containing inorganic salts providing sodium, potassium, and calcium ions, the total salt concentration in said solution being below 0.12 molar and said solution containing at least 40 sodium ions to each potassium ion, suspending the severed heart of a frog so that it is submerged within said solution and filling said heart interiorly with said solution, opposing the contraction of said heart by exerting a force of sufficient magnitude against the inside of the walls of said heart to develop measurable tension in said heart walls, passing an electric current between a point outside of said heart and a point within said heart at uniform intervals to cause said heart to beat at a definite frequency, measuring the systolic tension developed by said heart, varying the length of said uniform intervals between the passing of said current through said solution to cause said heart to beat at a different frequency, and again measuring the systolic tension developed by said heart to determine whether the tension has substantially changed and then comparing the measurements thus obtained with measurements obtained by the same procedure for a standard sample of the preparation having a known potency.

19. The method of comparing a digitalis preparation of unknown potency with a digitalis preparation of known potency, comprising testing one of said preparations and then the other by the same test procedure and comparing the results obtained, said test procedure comprising suspending the severed heart of a frog so that it is submerged within and filling said heart interiorly with a Ringer-type solution containing a sample of one of the digitalis preparations, opposing the contraction of said heart by exerting a force of sufficient magnitude against the inside of the walls of said heart to develop measurable tension in said heart walls, passing an electric current between a point outside of said heart and a point within said heart at uniform intervals to cause said heart to beat at a definite frequency, measuring the systolic tension developed by said heart, varying the length of said uniform intervals between the passing of said current through said solution to cause said heart to beat at a different frequency, and again measuring the systolic tension developed by said heart to determine whether the tension has substantially changed.

References Cited in the file of this patent

UNITED STATES PATENTS

| Number | Name | Date |
|---|---|---|
| 152,657 | Leach | June 30, 1874 |
| 1,400,848 | Anderson | Dec. 20, 1921 |
| 2,061,261 | Walter | Nov. 17, 1936 |

OTHER REFERENCES

Sherrington: Brit. Med. Journal Supplement, July 18, 1903, pages cxlvii–cxlviii, clvi.

Berry: The Pharmaceutical J. and Pharmacist, vol. 95, December 25, 1915, page 783.